(No Model.)
W. H. WILDER.
BEAN HARVESTER.
No. 479,480. Patented July 26, 1892.
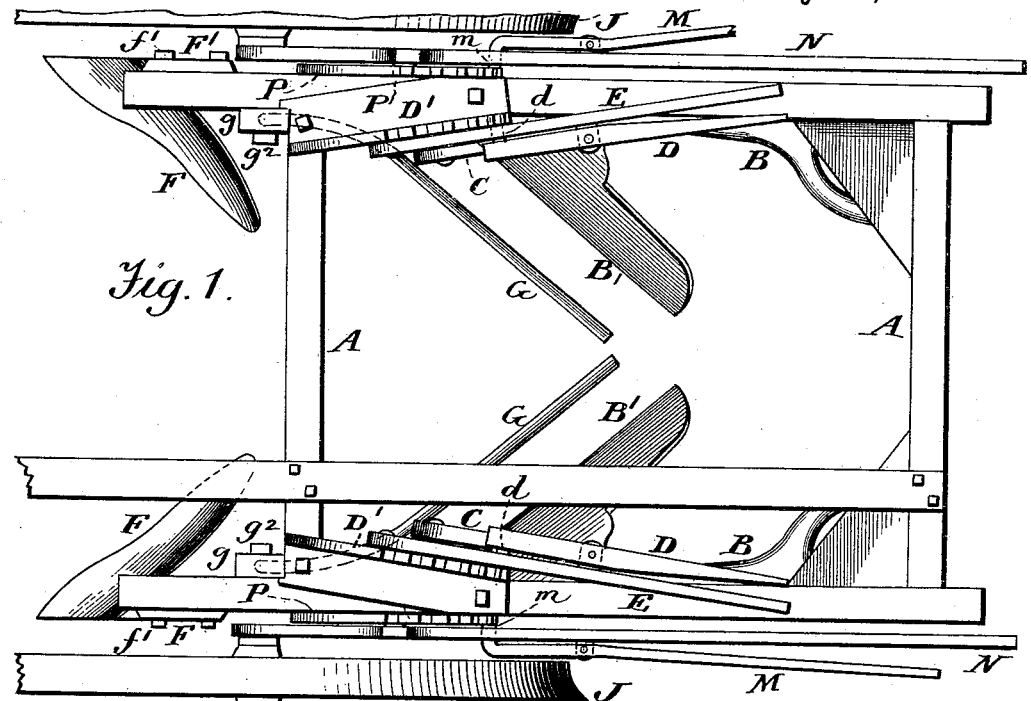
Fig. 1.
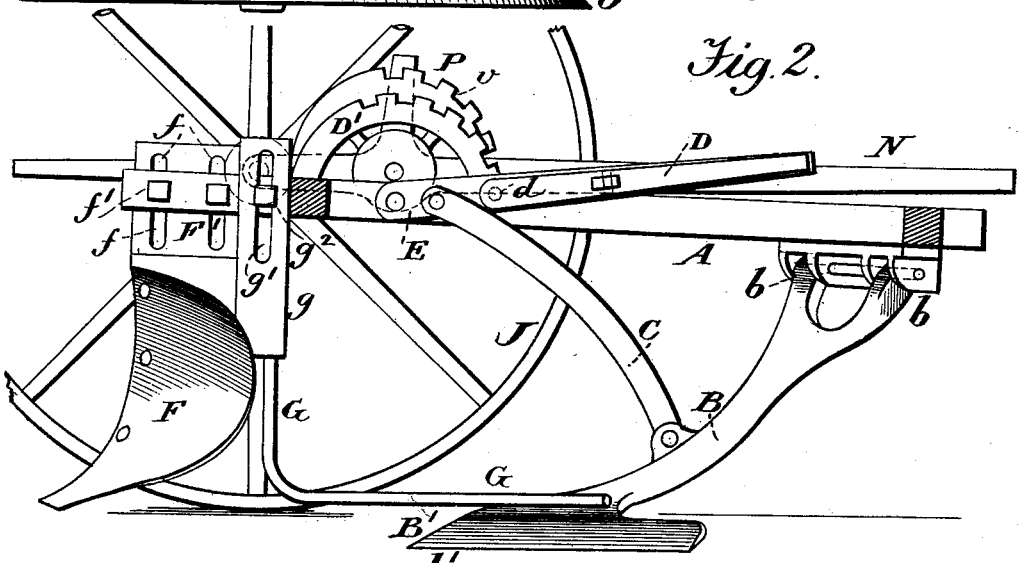
Fig. 2.
Fig. 3.
Witnesses.
A. Ruppert
H. A. Daniels
Inventor.
William H. Wilder
Per
Thomas P. Simpson
Atty.

UNITED STATES PATENT OFFICE.

WILLIAM HENRY WILDER, OF CALEDONIA, NEW YORK.

BEAN-HARVESTER.

SPECIFICATION forming part of Letters Patent No. 479,480, dated July 26, 1892.

Application filed September 24, 1891. Serial No. 406,706. (No model.)

*To all whom it may concern:*

Be it known that I, WILLIAM HENRY WILDER, a citizen of the United States, residing at Caledonia, in the county of Livingston and State of New York, have invented certain new and useful Improvements in Bean-Harvesters; and I do hereby declare the following to be a full, clear, and exact description of the invention, such as will enable others skilled in the art to which it appertains to make and use the same.

The special object of the invention is to make a bean-harvester in which the frame is never tilted and the shares have an independent adjustment to keep their lower edges always in a horizontal plane when in working position.

Figure 1 of the drawings is a plan view showing the two corresponding dividers, shares, and the parts connected therewith. Fig. 2 is a vertical longitudinal section, and Fig. 3 a diametrical section, of my wheel.

In the drawings, A represents the frame, which may be made of wood or metal, and B B are the standards which carry the shares B' B', which run under the vines to cut their roots. These standards B B are bibranched at their upper ends, pivoted at $b\ b$, and connected by rods C C, which are end-pivoted to the hand-levers E E. The latter have secondary levers D D pivoted thereon, provided with pins $d\ d$, which work through levers E E into the notches, grooves, or holes of the racks D' D'. By this means the shares B' B' may be raised or lowered and held at different adjustments. The hinges of the standards are placed in a line parallel to the edges $b'$ of shares B', so that said shares will always have their edges in a horizontal plane when in operation. The rods C C are hinged low down on the standards B B, so as to relieve their hinges from the backward strain, while the standards are forked at their upper ends, where they are hinged so as to be counterbraced against lateral strain from roots and other obstructions.

The rods C C are concaved on the under side to facilitate the passage of the vines thereunder, while the dividers F F, which run in front, separate the rows to be pulled from the adjacent ones. I make the dividers like the mold-board of a plow and fasten them to shanks F' F', which are slotted at $f\ f$, so as to be adjustable on the clamp-screws $f'\ f'$. The dividers are thus constructed so as to hold the vines until the shares B' B' take them out by the roots.

G G are rods, which direct the vines toward the middle of the machine and are provided with shanks $g\ g$, slotted at $g'$, so as to be adjusted by the set-screws $g^2$. Said rods also serve to prevent the vines from accumulating on the shares and standards.

J J are wheels journaled in the ends of levers N N, fulcrumed in the castings P P, which are bolted to the frame A. When the levers N N are horizontal, the wheels will be raised so as to let the shares B' B' into the ground, and when perpendicular the wheels will rest on the ground, while the machine will be raised therefrom to facilitate transportation.

The adjustability of the wheels J enables the depth of the shares B' B' to be nicely gaged by simply dropping the plugs $m$ on the secondary levers D into any of the notches $v$.

I make the perimeters of my wheels with the outer edges of their rims farther from the axes of their motion than the inner edges, so that the outer edges will enter the ground when the harvester is being used on a hillside.

What I claim as new, and desire to protect by Letters Patent, is—

1. In bean-harvesters, the root-cutter standard B, having an integral share B' at one end and at the other two counterbracing branches hinged separately to the frame at $b\ b$, the hinges being in a plane parallel to the edge $b'$ of the share, whereby the share B' may not be turned out of a horizontal plane.

2. The combination, with the share-shank B, the end-pivoted rod C, and the lift-lever E, of the secondary lever D and rack D', the said lever D being pivoted to lift-lever E and provided with a pin $d$, which passes through lever E into the notches of rack, as and for the purpose set forth.

In testimony whereof I affix my signature in presence of two witnesses.

WILLIAM HENRY WILDER.

Witnesses:
ALLAN B. MCKAY,
EDWARD B. MCKAY.